United States Patent [19]

Hench et al.

[11] Patent Number: 4,859,525
[45] Date of Patent: Aug. 22, 1989

[54] METHOD FOR LOW TEMPERATURE PROCESSING OF LIGHTWEIGHT SIC/SIO$_2$ COMPOSITES AND PRODUCTS

[75] Inventors: Larry L. Hench; Burtrand I. Lee, both of Gainesville, Fla.

[73] Assignee: University of Florida, Gainesville, Fla.

[21] Appl. No.: 704,937

[22] Filed: Feb. 25, 1985

[51] Int. Cl.$^4$ .......................... B05D 7/00; B32B 5/24; B32B 13/04
[52] U.S. Cl. .................. 428/260; 252/315.6; 264/42; 427/215; 427/219; 428/289; 428/408; 428/446
[58] Field of Search ...................... 252/315.6; 501/12; 264/42; 427/215, 219; 428/297, 446, 260, 289, 408

[56] References Cited

U.S. PATENT DOCUMENTS

| | | | |
|---|---|---|---|
| 3,309,212 | 3/1967 | Lubalin | 501/128 X |
| 3,702,279 | 11/1972 | Ardary et al. | 428/446 X |
| 4,341,826 | 7/1982 | Prewo et al. | 428/446 X |

FOREIGN PATENT DOCUMENTS

| | | | |
|---|---|---|---|
| 0004385 | 10/1979 | European Pat. Off. | 428/446 |
| 0035082 | 2/1984 | Japan | 428/446 |

Primary Examiner—Richard D. Lovering
Attorney, Agent, or Firm—Finnegan, Henderson, Farabow, Garrett and Dunner

[57] ABSTRACT

A composite made by preparing a SiO$_2$ sol, mixing 20–90% by volume of SiC particulate with the SiO$_2$ sol to form a slurry, casting the slurry into a mold optionally containing SiC weaves or mats, gelling and aging the cast slurry and drying to obtain a green body composite.

4 Claims, 1 Drawing Sheet

SiC/SiO₂ SLURRY

SiC CONTINUOUS FIBER / SiO₂

SiC WEAVE / SiO₂ LAYER

SiC PARTICULATE / SiO₂ LAYER

METHOD FOR LOW TEMPERATURE PROCESSING OF LIGHTWEIGHT SIC/SIO$_2$ COMPOSITES AND PRODUCTS

BACKGROUND OF THE INVENTION

The present invention relates to a novel method for producing lightweight SiC/SiO$_2$ composites and to unique articles produced thereby.

DESCRIPTION OF PRIOR ART

A need exists in the art for lightweight silicon carbide/silica composites capable of being processed at much lower temperatures than conventionally prepared composites of the same constituents, for use in the production of heat engine parts, provided the substantially lower processing temperature does not result in a sacrifice of mechanical strength for the finished parts. Copending applications Ser. Nos. 583,741: 924,178 (now abandoned); and 924,179 (now abandoned) filed Oct. 27, 1986 describe sol-gel techniques to produce pure silica glass monoliths. This invention takes advantage of the principles of these previous developments to make it possible to form microporous SiC/SiO$_2$ composite green bodies at near room temperature in several hours. The low temperature process can then be followed by desired heat treatments of the green bodies in desired shapes to control density and thermophysical properties of the final parts. The consequence of discovering this novel processing method is a major advance in processing economics resulting from the simplicity of the procedure, low temperature processing, and shortened processing time, to produce lightweight, high temperature materials (refractory matrix with refractory filler) where very high mechanical strength is less important.

SUMMARY OF THE INVENTION

The present invention provides a method for obtaining SiC/SiO$_2$ composites with 20-90% volume loadings of SiC thereby resulting in strong lightweight structures. The structure of the composite can be random, non-directional, oriented, unidirectional, bidirectional or laminated. The SiC is specially pretreated to render it compatible with the SiO$_2$ sol used to form the SiO$_2$ matrix for the SiC filler. Green bodies of SiC/SiO$_2$ are prepared and cast in any desired shape through special processing and are ultimately fired to produce the final shaped composite.

DETAILED DESCRIPTION OF INVENTION

Figure 1:
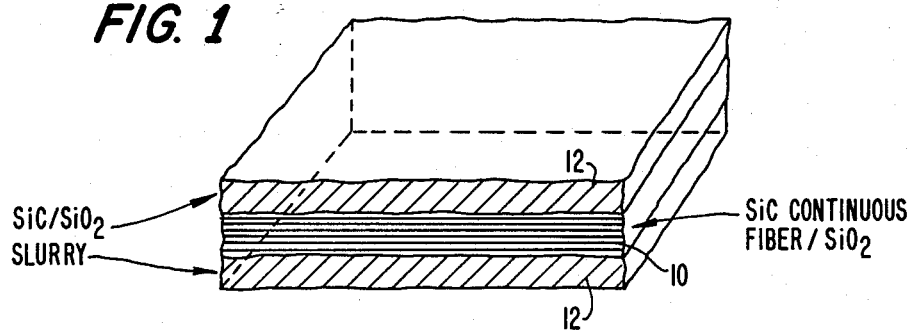
FIG. 1 is a schematic representation of a laminated structure showing SiC continuous fiber and SiC particulate in a silica matrix sandwiched or laminated between layers of SiC particulate in a silica matrix.

Commercially available SiC in any desired particulate form; fibers, whiskers, powder, etc. is heated at 900° C. for 2 hours in the air to remove any surface coating, sizings, or contaminants. This will introduce a monolayer of SiO$_2$ on the SiC surface by surface oxidation. The surface SiO$_2$ layer on SiC will increase the wettability of the SiO$_2$ sol when the SiC is mixed with the sol.

SiO$_2$ sol is prepared by any known or conventional method such as one of those disclosed in the aforementioned co-pending applications. The following is a description of an example of of such methods. The SiO$_2$ sol is prepared by hydrolyzing (water) tetraethyloxysilane (TEOS) or tetramethyloxysilane (TMS) with HCl, HNO$_3$, or trichloroacetic acid at pH 2-4, and ethanol or methanol in the mole ratio of 1:4:0.5:0.06 TEOS:water:alcohol:hydrochloric acid.

A dispersant which is suited for SiO$_2$ (e.g., Triton X-100, a non-ionic surfactant) is added to the SiO$_2$ sol. Alternatively, the pH is adjusted to 5-6 by adding ammonium hydroxide or tetraethyl ammonium hydroxide or brought well below 2 by adding an acid. Also, the sol is kept cool (e.g., 0° C.) to prevent premature gelation. Next the sol is vacuum mixed with SiC particulate as previously treated and then ultrasonicated for 4-8 minutes with cooling if necessary.

The volume loading of SiC in the final composite is predetermined for the size of the desired composite body and can vary from 20-90% volume percent. The mixture is cast into a mold of desired shape and configuration. The mold is preferably plastic in nature, such as polystyrene, polyethylene or PFTE. If glass or metal is used as the mold, a mold releasing agent will probably be necessary. For continuous SiC fiber, SiC mat, or SiC weave reinforcement, the SiO$_2$ sol/SiC mix may be cast on a bed of continuous SiC fiber, SiC mat or SiC weave.

EXAMPLE 1

SiC/SiO$_2$ composites of SiC particulates and SiO$_2$ matrix were made as follows:

100 ml of SiO$_2$ sol was prepared by hydrolyzing tetraethyloxysilane (TEOS; Fisher Scientific), ethanol, deionized/distilled water, and hydrochloric acid in the molar ratio of 1:0.5:4:0.06 for TEOS:ethanol:water:HCl at room temperature for 10 minutes. The following quantities were used: 56 ml TEOS, 8 ml ethanol, 18 ml water, and 1 ml HCl. The ethanol is added to the TEOS then the HCl+H$_2$O solution is added to the TEOS+alcohol solution at room temperature while stirring the TEOS solution vigorously with a magnetic stirrer. The hydrolysis reaction occurs during the subsequent 10 minute mixing. After the hydrolysis reaction is completed, 3 drops of Triton X-100 is added. Other additives that help wetting or dispersion of the SiC can be used. Also, 3 ml of formamide as a drying control chemical additive and 1 ml of glycerol as an agent to render the gel or green body more flexible can be added to the sol. The completion of hydrolysis is noted by a decrease in sol temperature since the hydrolysis reaction is highly exothermic.

Approximately 200 g of β-SiC powder was made by vibratory ball-milling of chopped Nicalon fiber (1 mm in length, obtained from Dow Corning) for 1 hour. The Nicalon fiber was pretreated with solvents to remove its sizing of polyvinyl acetate. The fibers were soaked in 500 ml solvent of each of two solvents for ½ hour and washed with the two solvents. The solvents used were ethylacetate and acetone. Each solvent was used twice. Thereafter, the fibers were fired in air at 600° C. for 2 hours. The particulate β-SiC obtained, from ball milling and solvent washed fiber, was soaked and stirred intermittently for 1 hour in 200 ml in ethanol containing 1 volume percent of Triton X-100 (Fisher Scientific). The wet SiC was dried in air at 80° C. for 12 hours. Any particle clumps were crushed manually. The SiC had a mean particle size of about 100 mesh.

50 g of the Triton X-100 treated SiC was placed in the 100 ml $SiO_2$ sol and mixed well with a spatula for 5 minutes and then ultrasonicated for 5 minutes before casting in a number of polystyrene molds of desired shapes and sizes. The molds were covered and sealed with Teflon tape and placed in an oven at 65° C. for 12 hours for gelation and aging. After 12 hours of aging of the $SiO_2$+SiC composites, the molds were opened and the gels dried for 10 hours at 80° C.

The dried $\beta$-SiC/$SiO_2$ green composites were dipped into a $SiO_2$ sol, which had been prepared by hydrolyzing TEOS, for 10 minutes until all gas bubbles from the pores of the composites were replaced by $SiO_2$ sol. The dipped green composite was then dried for 10 hours at 80° C. The drying-dipping cycles were repeated 4 times. Density of these composites in the green state was 1.7-1.9 g/cc. Heat treatments in nitrogen at 500° C., 900° C. and 1100° C. for 4 hours increased the density to 1.9-2.2 g/cc. A mean flexural strength of 5,000 psi was obtained. These results are listed in Table 1.

TABLE 1

Mean Density Changes and Flexural Strengths After Heat Treatments in $N_2$ of SiC/$SiO_2$ Composites in Example 1.

| Temperature | DENSITY, g/cc | STRENGTH, psi |
| --- | --- | --- |
| 80° C. | 1.6 | 3500 |
| 500° C. | 1.8 | 4000 |
| 900° C. | 2.0 | 4500 |
| 1100° C. | 2.2 | 5000 |

EXAMPLE 2

Unidirectional SiC fibers/$SiO_2$ composites were made by the same $SiO_2$ sol procedure as described in Example 1. However, 3 drops of 3-amino-propyltriethoxysilane was added in place of Triton X-100 as a wetting agent. The $\beta$-SiC fibers (obtained commercially from Nippon Carbon Co. and distributed by Dow Corning, Midland, Mich.) were pretreated with a propane flame to remove the polyvinyl acetate coating on the surface of $\beta$-SiC Nicalon fibers. Flame burning of the coating reqired no longer than 30 seconds on any one area of the fibers.

40 ml of $SiO_2$ sol (prepared as in Example 1) was mixed with 10 g of Nicalon powder (made as in Example 1) forming a dilute slurry. About 20 ml of the slurry was poured into a 3"×1" rectangular polystyrene mold and about 5 g of continuous Nicalon fibers in length wise parallel with the mold were laid flat above the SiC/$SiO_2$ sol slurry, then the rest of $SiO_2$/SiC slurry was poured on the bed of the continuous Nicalon fibers. The slurry plus the fibers were placed on an ultrasonicator for 30 seconds to expel any gas bubbles. The mold was sealed with an elastic tape (Teflon) and placed in an oven at 65° C. as in Example 1. Other procedures and treatments were identical to those in Example 1. The layout of the composite body is shown in FIG. 1 and consists of a layer 10 of continuous fibers and SiC particulate in a $SiO_2$ matrix laminated to or formed integrally with layers 12 of SiC particulate/$SiO_2$.

Figure 2:
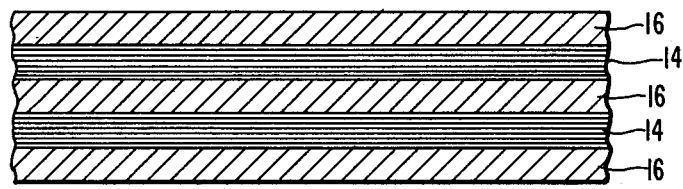
FIG. 2 is a schematic representation of a laminated structure similar to FIG. 1 showing multilayers of continuous β-SiC fiber and particulate SiC contained in a SiO$_2$ matrix surrounded by layers of SiC particulate in a SiO$_2$ matrix.

The layers of SiC fibers and SiC particulate/$SiO_2$ can be stacked or laminated together as shown in FIG. 2 where two layers 14 of SiC fibers in a $SiO_2$ matrix are laminated to or formed integrally with three layers 16 of SiC particulate/$SiO_2$. In both FIG. 1 and FIG. 2, layers 10 and 14, the matrix material, is aptly described as SiC particulate/$SiO_2$.

EXAMPLE 3

Figure 3:
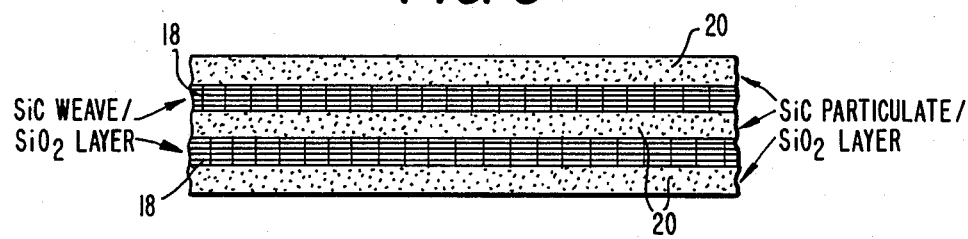
FIG. 3 is a schematic representation of a laminated structure showing alternating layers of SiC weave and SiC particulate in a SiO$_2$ matrix and particulate SiC in a SiO$_2$ matrix.

Bidirectional SiC/$SiO_2$ composites were made using Nicalon SiC weave (16 yarns/inch woven) after burning off the sizing, and $SiO_2$ sol containing SiC particulate as described in the previous examples. The cross section is shown in FIG. 3 and the structure is multilayer and is composed of layers 18 of SiC weave in a SiC particulate/$SiO_2$ matrix laminated to or formed integrally with layers 20 of SiC particulate/$SiO_2$. The same $SiO_2$ sol and same procedures are used as in Example 1.

EXAMPLE 4

$\alpha$-SiC whisker/$SiO_2$ composites were made using single crystal whisker Silar (manufactured and distributed commercially by ARCO). Typical whisker length is 10-80 microns with 0.15 microns diameter. Any clumps and balls were dispersed with vibratory ball-milling for 10 minutes after the whiskers were fired at 800° C. for 1 hour.

30 ml of $SiO_2$ sol, as in Example 1, was mixed vigorously with 25 g of Silar by hand for 1 minute before placing on a ultrasonicator for 5 minutes. After ultrasonication, the slurry was cast in a polystyrene mold and sealed before the mold was placed in an oven at 70° C. for 10 hours for gelation and aging. Drying, dipping cycles, and heat treatments were the same as those in Example 1.

The general characteristics of SiC/$SiO_2$ composites made by this invention are as follows.

The composites are low density less than 2.5 g/cc. Some closed pores are entrapped in the body. Open porosity measured by mercury porsimeter was about 10% for the samples in Example 1. The oxidation rate of SiC in $SiO_2$ matrix in dry oxygen at 1000° C. was found to be 5-6 times slower than the corresponding raw SiC in same condition. The dimensional stability of the composites was better for Nicalon than for Silar. The total shrinkage of external dimensions of the Nicalon composites was less than 5% and that of Silar was about 5-10%. SEM micrographs of fractured surfaces of the composites (Nicalon/$SiO_2$) showed fiber-pull-out of the continuous Nicalon fiber. Heating the composites at 1550° C. in air for 4 hours showed no visible change or damage on the composite bodies. No significant increase in density of the composite was observed.

Having now fully described the invention, it will be apparent to one of ordinary skill in the art that many changes and modifications can be made without departing from the spirit and scope of the invention as set forth herein.

What is claimed is:

1. A method for making a plural layer composite comprising forming a layer of SiC particulate containing $SiO_2$ gel and forming a contiguous layer of SiC in the form of a structure selected from the group consisting of fibers, whiskers, weaves and mats embedded in a matrix of SiC particulate containing $SiO_2$ gel.

2. The method of claim 1 wherein multilayers are contiguously formed with the outer layer formed of SiC particulate containing $SiO_2$ gel.

3. A plural layer composite comprising a first layer composed of SiC containing $SiO_2$ gel and a second contiguous layer composed of a SiC structure selected from the group consisting of fibers, whiskers, weaves and mats embedded in a matrix of SiC particulate containing $SiO_2$ gel.

4. The plural layer composite of claim 3 having an outer layer formed of SiC particulate containing $SiO_2$ gel.

* * * * *

UNITED STATES PATENT AND TRADEMARK OFFICE
CERTIFICATE OF CORRECTION

PATENT NO. : 4,859,525
DATED : August 22, 1989
INVENTOR(S) : Hench et al.

It is certified that error appears in the above-indentified patent and that said Letters Patent is hereby corrected as shown below:

In column 1, after the tile and before "BACKGROUND OF THE INVENTION" insert the following paragraph:

read --This invention was made with Government support under F492620-83-C-0072 awarded by the Air Force. The Government has certain rights in this invention.--

Signed and Sealed this

First Day of November, 1994

Attest:

BRUCE LEHMAN

Attesting Officer

Commissioner of Patents and Trademarks